No. 718,088. PATENTED JAN. 13, 1903.
F. R. CARPENTER.
PROCESS OF SEPARATING PRECIOUS METALS FROM ORES.
APPLICATION FILED AUG. 28, 1900.
NO MODEL.
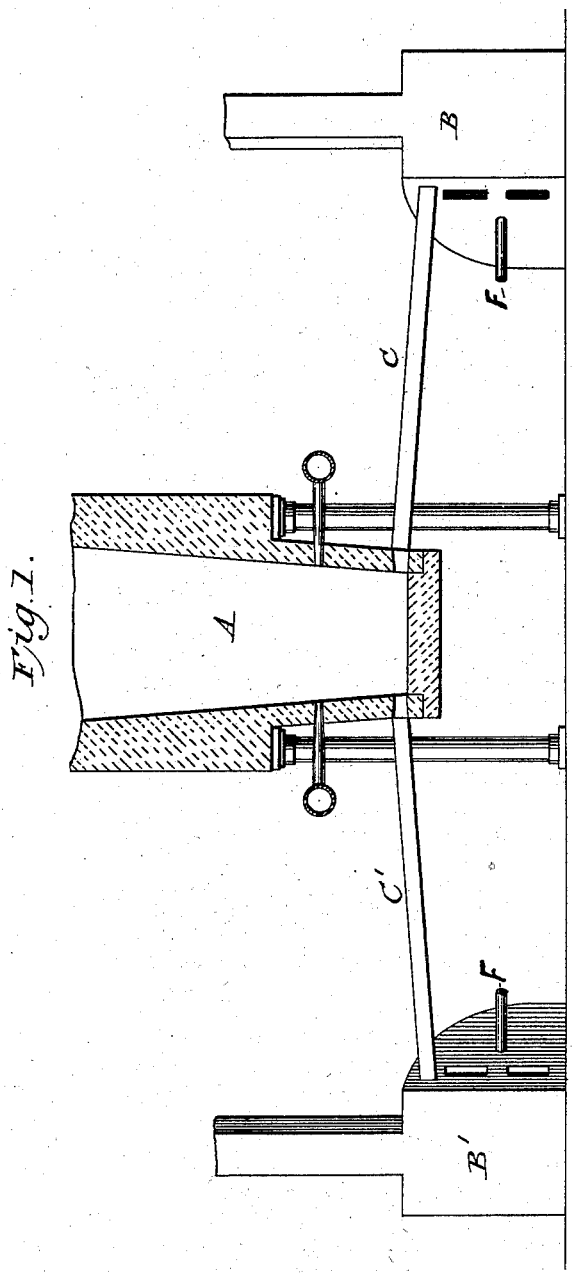
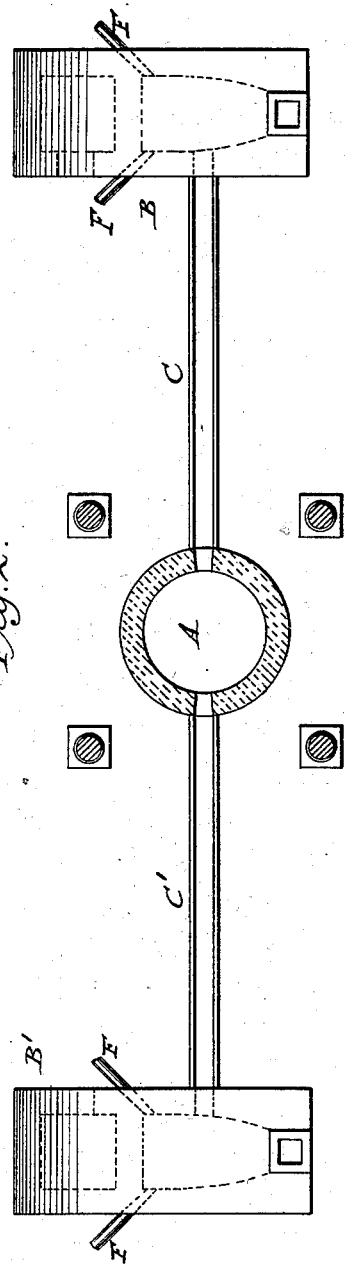
Witnesses
Inventor:
Franklin R. Carpenter,
by his attorneys

UNITED STATES PATENT OFFICE.

FRANKLIN R. CARPENTER, OF DENVER, COLORADO, ASSIGNOR OF ONE-HALF TO JOSEPH H. BERRY, OF DETROIT, MICHIGAN.

PROCESS OF SEPARATING PRECIOUS METALS FROM ORES.

SPECIFICATION forming part of Letters Patent No. 718,088, dated January 13, 1903.

Application filed August 28, 1900. Serial No. 28,343. (No specimens.)

*To all whom it may concern:*

Be it known that I, FRANKLIN R. CARPENTER, a citizen of the United States, residing at Denver, in the county of Arapahoe and State of Colorado, have invented certain new and useful Improvements in Processes of Separating Precious Metals from Ores, of which the following is a specification.

My present invention relates to those processes of separating precious metals from mattes containing them in which the matte is subjected to the action of a bath of molten lead, which dissolves and absorbs the gold and silver.

My present invention is especially intended for use on iron mattes containing gold, silver, copper, and incidentally other metals in variable quantities.

In subjecting mattes to lead-baths for the purpose of recovering precious metals it has been found that the bath becomes contaminated with copper, which requires a subsequent reduction process for its separation, there is a loss of lead by absorption in the matte, and, finally, that the lead fails to completely remove the precious metals from the matte, which latter will be found to contain them when removed from the bath. All of these difficulties result from the fact that under existing conditions the lead reacts upon some one or more of the metallic sulfids contained in the matte, forming lead sulfid, the presence of which is sufficient to account for all of the difficulties above pointed out. Attempts have been heretofore made to remove the difficulties, as by the use of successive baths of fresh molten lead and by the insertion of metallic iron in the lead-bath to reduce the lead sulfid when formed. These attempts have been only partially successful. By my process I completely remove the difficulties which have heretofore existed, and obtain as products lead containing substantially all of the precious metals originally contained in the matte and no copper and a matte substantially free from gold, silver and lead, bath in condition for any ordinary or preferred treatment for the recovery of, from the one, gold and silver, and, from the other copper.

In detail my process is practiced as follows: A suitable charge of ore is smelted, so as to obtain iron matte in the ordinary way. If the matte has been previously formed, it need only be melted. On the hearth of a suitable furnace provided with means for keeping the materials molten is prepared a bath of molten metallic lead. Into this molten bath is poured a quantity of the molten iron matte, however prepared. The matte being lighter than the lead rises to the surface and forms a protective covering for the lead during the subsequent treatment. Any slag which may appear on the surface of the matte during this or at any subsequent time should preferably be removed, so as to leave the surface of the matte clean. The surface of the molten matte is now subjected to an oxidizing atmosphere, and the contents of the furnace are maintained in a molten condition. This oxidizing atmosphere may be produced in any suitable or desired way—for instance, by blowing upon or over the surface of the matte a blast or blasts of air or by admitting an excess of air at or over the grate of the furnace. The purpose and effect of this oxidizing atmosphere in contact with the surface of the molten matte are to oxidize a portion of the contained sulfur. This oxidation of the sulfur at the temperature of molten matte acts to reduce some of the metals with which it was combined—for instance, $$FeS + O_2 = Fe + SO_2.$$

If the oxidation was sufficiently vigorous, iron oxid and metallic copper might be produced; but this is not desirable, and if the formation of iron oxid is perceived the supply of air should be partially cut off. The supply of air need not be maintained continuously, but may be interrupted from time to time. Since lead sulfid cannot form or exist in the presence of metallic iron at the temperature of the molten mass, it will not be formed to be present to interfere with the proper action of the process, and, moreover, any lead sulfid which may have been present in the original matte will be reduced and unite with the lead-bath. The contents of the furnace are rabbled continuously or from time to time, as is usual in practicing this process, and the process is continued until there is a substantially complete separation of the precious metals from the matte. At this time the matte will be drawn off for further treatment for the recovery of copper and any other contained values or otherwise disposed of. The lead remaining in the furnace if sufficiently saturated with precious metals will be drawn off and treated as lead bullion; otherwise another charge of iron matte may be supplied to it and the process above described repeated.

While I have described the lead-bath as prepared in a furnace and a charge of molten iron matte, separately prepared, poured on it, it is obviously an equivalent to melt the lead and matte together in the same furnace or to melt the lead in a furnace and then place upon it iron matte in a solid state and then continuing the heating until the matte is melted.

In the accompanying drawings is represented apparatus which may be conveniently used in my process, and in which—

Figure 1 is a view, partly in section and partly in elevation, of a smelting-furnace and two reverberatory furnaces connected therewith; and Fig. 2 is partly a horizontal section and partly a plan view of same.

In the drawings, A represents an ordinary cupola-furnace adapted to smelt pyritic ores into matte; but any other desired form of smelting or melting furnace may be substituted therefor, according to commercial conditions, and B B' represent two reverberatory furnaces provided with air-blast F F. The furnace A is placed on a higher level than the furnaces B B', and spouts C C' are provided to connect them. The cupola or any furnace substituted therefor is employed for producing molten iron matte, and in the reverberatory furnaces B B' baths of molten lead are prepared and the molten matte from the furnace treated therewith. The advantage of using two reverberatory furnaces is that there is always a furnace ready when it becomes necessary to tap the furnace A. The reverberatory furnaces are preferably lined with basic materials.

I do not herein claim, broadly, the process of separating precious metals from matte containing them, which consists in causing an intimate mixture of the matte with metallic iron or dissolving metallic iron in molten matte and then subjecting the mixture to a bath of molten lead, as this subject-matter is claimed in my application for patent, Serial No. 123,324, filed September 13, 1902.

What I claim is—

1. The process of separating a precious metal from iron matte containing it which consists in bringing molten iron matte containing a precious metal, and molten metallic lead in contact with each other and subjecting the former to an oxidizing atmosphere, substantially as described.

2. The process of separating precious metals from iron matte containing them which consists in preparing separately molten lead and iron matte containing precious metals, bringing them in contact with each other, and subjecting the matte to an oxidizing atmosphere, substantially as described.

3. The process of recovering precious metals which consists in forming a molten iron matte and subjecting the same to an agent, capable of reducing a portion of the contained iron sulfid and to a bath of molten lead, substantially as described.

In testimony whereof I have hereunto subscribed my name.

FRANKLIN R. CARPENTER.

Witnesses:
ARTHUR HOWE CARPENTER,
F. E. JOHNSON.